United States Patent [19]

Uemura

[11] Patent Number: 4,701,817
[45] Date of Patent: Oct. 20, 1987

[54] LOADING AND EJECTING MECHANISM FOR A MAGNETIC TAPE CASSETTE APPARATUS

[75] Inventor: Yasuhiro Uemura, Tanashi, Japan
[73] Assignee: Teac Corp. & Nippon Landex Ltd., Tokyo, Japan
[21] Appl. No.: 658,293
[22] Filed: Oct. 5, 1984
[30] Foreign Application Priority Data Oct. 14, 1983 [JP] Japan ............................ 58-191835

[51] Int. Cl.$^4$ ...................... G11B 5/008; G11B 15/00
[52] U.S. Cl. ....................................... 360/96.5; 360/93
[58] Field of Search ...................... 360/93, 96.1, 96.3, 360/96.5, 132, 137; 242/197–200

[56] References Cited
U.S. PATENT DOCUMENTS

| | | | |
|---|---|---|---|
| 3,697,085 | 10/1972 | Ban | 360/93 |
| 4,021,005 | 5/1977 | Takemoto et al. | 242/198 |
| 4,136,367 | 1/1979 | Righi | 360/96.5 |
| 4,161,007 | 7/1979 | Haraguchi | 360/137 |

*Primary Examiner*—Stuart N. Hecker
*Assistant Examiner*—Benjamin E. Urcia
*Attorney, Agent, or Firm*—Woodcock Washburn Kurtz Mackiewicz & Norris

[57] ABSTRACT

An apparatus suitable for digital data transfer with a tape cassette is designed to require no movement of a magnetic transducer head to establish data transfer contact between the head and a tape cassette. The tape cassette is inserted in the apparatus in the direction of a notional line intersecting at right angles the axes of rotation of the pair of hubs of the tape cassette. Upon full insertion in the apparatus the tape cassette has its apertured front side held opposite the transducer head. A cassette shift mechanism subsequently transports the loaded tape cassette in a direction normal to the notional line, into data transfer contact with the transducer head. A tape transport shift mechanism also operates to move a pair of motor driven spindles into driving engagement with the respective hubs of the tape cassette. The insertion of the tape cassette automatically triggers the operation of both cassette shift mechanism and tape transport shift mechanism. A preferred embodiment additionally comprises an ejector mechanism including a pushbutton. Upon activation of this ejector pushbutton the tape transport shift mechanism moves the drive spindles out of engagement with the cassette hubs, and the cassette shift mechanism retracts the cassette away from the transducer head and further ejects the cassette from the apparatus.

7 Claims, 23 Drawing Figures

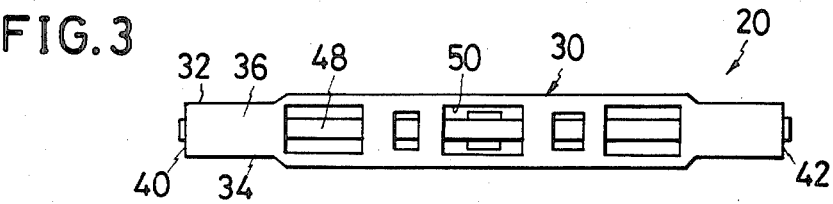
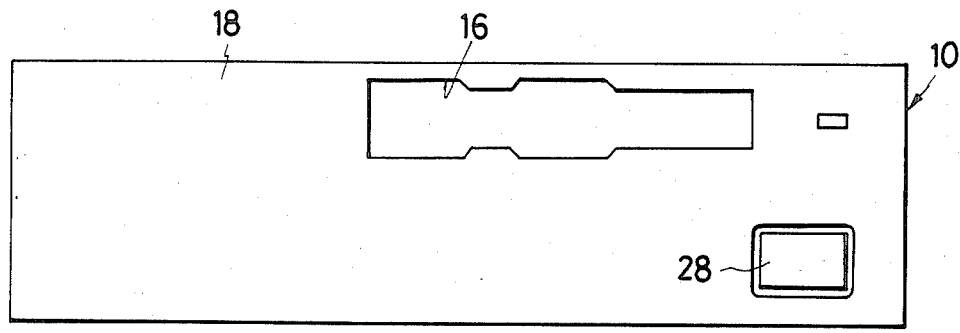
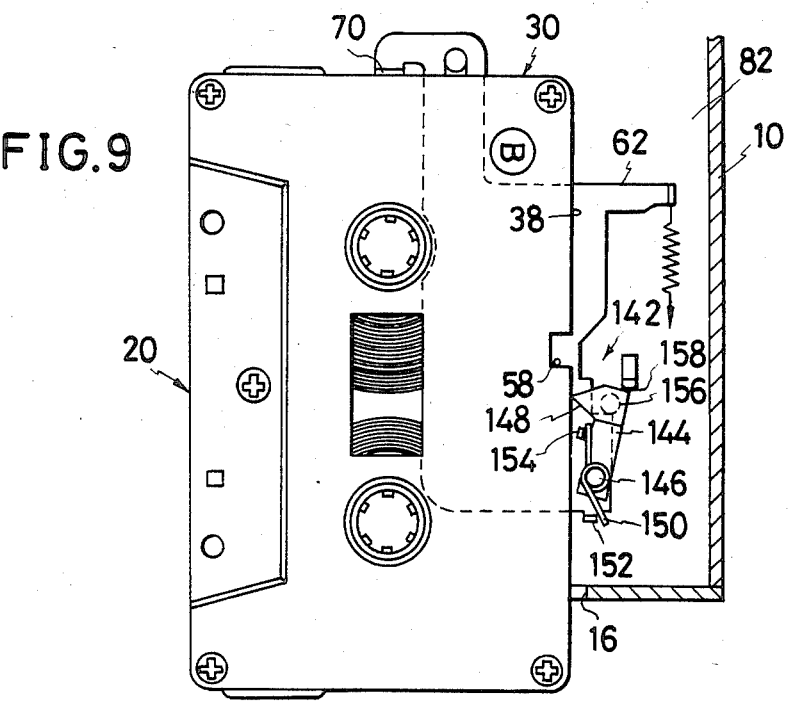

FIG.10
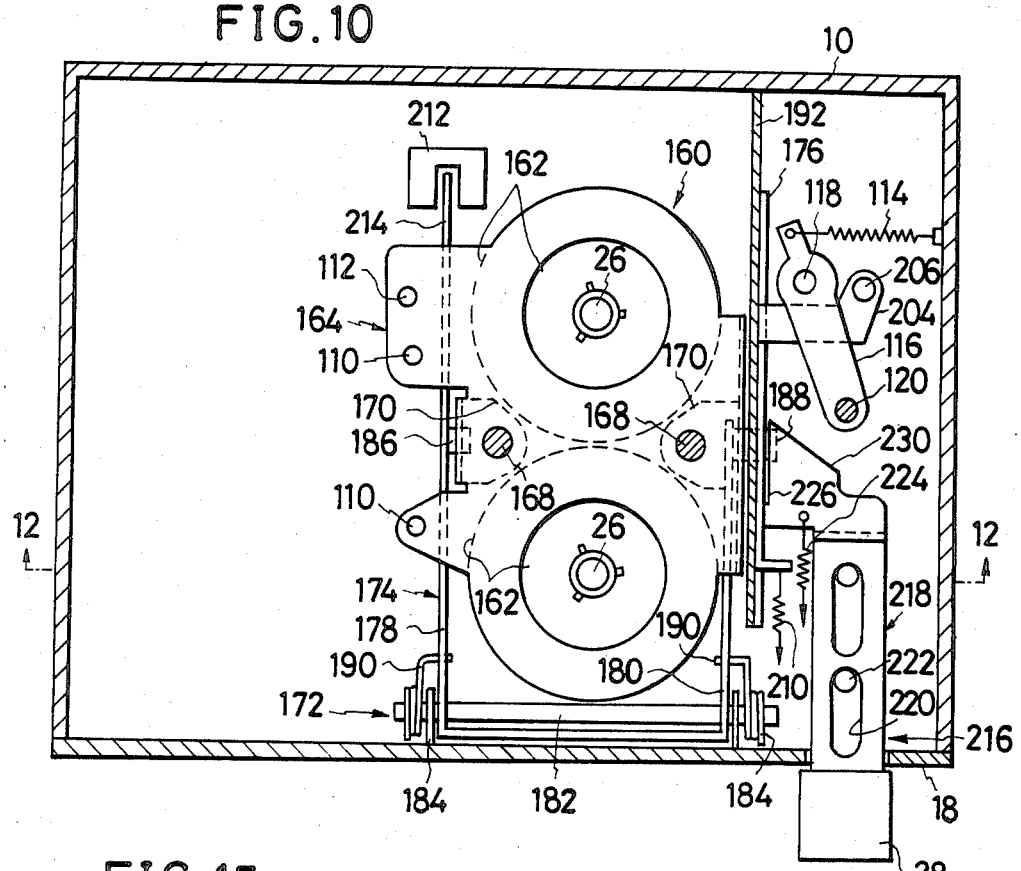
FIG.15
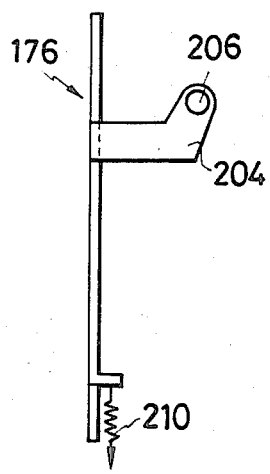
FIG.16

LOADING AND EJECTING MECHANISM FOR A MAGNETIC TAPE CASSETTE APPARATUS

BACKGROUND OF THE INVENTION

My invention relates to apparatus for the recording and/or reproduction of information on and from magnetic tape packaged in cassette form, and more specifically to such apparatus that dispenses with the long familiar pivoted cassette cradle. The magnetic tape cassette apparatus in accordance with my invention is particularly well suited for the processing of digital signals.

Magnetic tape cassette players or decks have commonly been equipped with a hinged cassette cradle pivotable relative to the casing between a loading position to allow the loading of a tape cassette therein and a data transfer position for running the magnetic tape within the cassette with respect to a magnetic transducer head for data transfer therebetween. For data transfer contact with the tape the transducer head has usually had to move into engagement with the tape cassette after the latter has been pivoted to the data transfer position with the cradle. Thus, generally, the movement of both tape cassette and transducer head one with respect to the other has been necessary for the establishment of data transfer contact therebetween. This general conventional design is objectionable from the standpoints of complex construction required and the possible misalignment of the tape cassette and transducer head.

A solution to this problem is found in U.S. Pat. No. 4,167,007 issued to Haraguchi on July 10, 1979. This patent proposes an essentially fixed mounting of the transducer head, with the tape cassette moved linearly into data transfer contact therewith. I have found this solution unsatisfactory, however. My objection is to the fixed mounting of the tape transport comprising a pair of motor driven spindles for engagement with the hubs of the tape cassette. The fixed tape transport demands the movement of the tape cassette into engagement therewith following its movement into data transfer contact with the transducer head. For this reason the prior art apparatus has not yet been able to dispense with the hinged cassette cradle, which practically makes the actual width or depth of the apparatus inordinately large and so makes it inconvenient of use.

SUMMARY OF THE INVENTION

I have succeeded in eliminating the pivotal cassette cradle from the magnetic tape cassette apparatus of the type in question and hereby propose apparatus of novel design that requires the movement of only the tape cassette in one and the same plane for the establishment of its data transfer contact with the transducer head. The novel apparatus in accordance with my invention makes it possible to bring the loaded tape cassette into exact position for data transfer with the transducer head. Further the apparatus is more convenient of use than the related prior art as its casing has no hinged part that would practically increase the dimension of the casing in a direction at right angles with the axis of the hinged part.

The magnetic tape cassette apparatus in accordance with my invention may be broadly summarized as comprising a casing having defined therein an entrance slot or like opening in which a tape cassette is to be inserted lengthwise, that is, in the direction of a notional line intersecting at right angles the parallel axes of rotation of the hubs of the tape cassette. The tape cassette upon full insertion in the entrance slot reaches a preassigned retracted position within the casing. Mounted within the casing is a transducer head having a gapped data transfer surface confronting, with a spacing therebetween, the apertured front side of the tape cassette lying in the retracted position. Cassette shift means transport the loaded tape cassette transversely from its retracted position to a working position, where the tape cassette has its tape held against the data transfer surface of the transducer head through the apertured front side thereof. Normally held retracted away from the plane of the loaded tape cassette, a pair of drive spindles constituting parts of a tape transport are moved axially by tape transport shift means into driving engagement with the respective hubs of the tape cassette lying in the working position.

Thus, after being inserted lengthwise to the retracted position within the casing through the entrance slot, the tape cassette is conveyed, in a direction at a right angle with the direction of its insertion, from the retracted to the working position for data transfer contact with the transducer head. No movement of the transducer head is required for the establishment of data transfer contact with the tape cassette. The stationary transducer head also makes it possible to move the tape cassette into exact position for data transfer with the head.

It is to be appreciated that the tape cassette travels only in its own plane, from the insertion in the entrance slot to the retracted position within the casing and thence to the working position. The thickness of the casing can therefore be reduced to a minimum. No hinged cassette cradle is required, either, since not the tape cassette but the tape transport is moved relative to the casing into and out of driving engagement with the tape cassette.

Preferably, as in the preferred embodiment disclosed herein, the cassette shift means automatically transport the tape cassette from the retracted to the working position upon full insertion of the tape cassette into the casing. Further, in response to this operation of the cassette shift means, the tape transport shift means operate automatically to move the drive spindles into engagement with the cassette hubs. The operator is therefore required merely to push the tape cassette in the entrance slot for the establishment of its data transfer contact with the transducer head and for the driving engagement of the tape transport with the tape cassette. The preferred embodiment is also well calculated for the easy ejection of the tape cassette upon completion of data transfer.

The above and other features and advantages of my invention and the manner of realizing them will become more apparent, and the invention itself will best be understood, from a study of the following description and appended claims, with reference had to the attached drawings showing the preferred embodiment of the invention.

BRIEF DESCRIPTION OF THE DRAWINGS

FIG. 2 is a front elevation of the apparatus constructed in accordance with the principles of my invention;

FIG. 3 is a front elevation of the tape cassette for use with the apparatus of FIGS. 1 and 2;

FIG. 9 is a fragmentary horizontal section through the apparatus of FIG. 1, shown together with a plan view of the tape cassette incompletely inserted therein, the view revealing in particular the cassette rejector mechanism for preventing the insertion of the tape cassette with its wrong side up;

FIG. 10 is a horizontal section through the apparatus, taken along a plane different from that of FIGS. 4 and 5 and showing in particular the tape transport mechanism, tape transport shift mechanism, and ejector mechanism, which the ejector mechanism being shown in a state for the ejection of the tape cassette;

FIG. 15 is a top plan view of the cam forming a part of the tape transport shift mechanism;

FIG. 16 is a right hand side elevation of the cam of FIG. 15;

DESCRIPTION OF THE PREFERRED EMBODIMENT

General

The above drawings illustrate the apparatus of my invention as adapted for the transfer of digital signals with a multitrack tape cassette. I will first describe the general operating principle of the illustrated tape cassette apparatus with particular reference to FIG. 1. The apparatus has a generally flat, boxlike casing 10 within which a magnetic transducer head 12 is mounted with its gapped data transfer surface 14 oriented to the right as viewed in FIG. 1. The transducer head 12 is immovable at least in a direction normal to its data transfer surface 14. In this particular embodiment, which is intended for use with a multitrack tape cassette as aforesaid, the transducer head 12 is movable in the width direction of the magnetic tape, not shown in FIG. 1, to be held against its data transfer surface 14.

Figure 1:
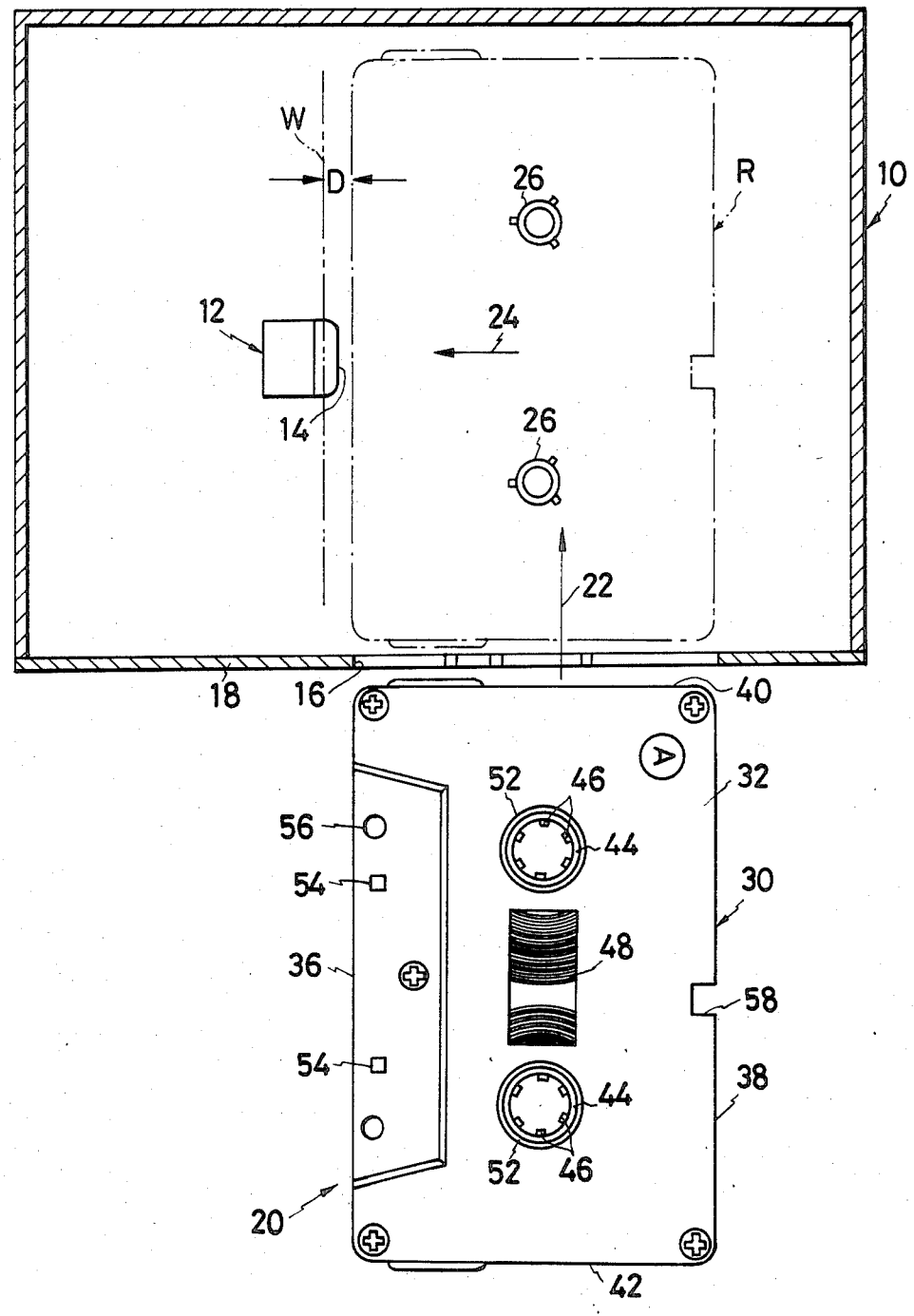
FIG. 1 is a diagrammatic representation of the general operating principles of the magnetic tape cassette apparatus in accordance with my invention, showing the casing of the apparatus in a horizontal section and a magnetic tape cassette for use therewith in a plan view.

As will be seen from both FIGS. 1 and 2, the casing 10 has an entrance slot or opening 16 defined in its front face 18. A magnetic multitrack tape cassette 20 is to be inserted through this entrance slot 16 into the casing 10 in the direction of an arrow 22 in FIG. 1. The front face 18 of this magnetic tape cassette apparatus can be made equal in size and shape to that of the standard floppy disk drive.

FIG. 2 also depicts the correct attitude with which the tape cassette apparatus is intended for use. The casing 10 is to be placed recumbently, rather than upstandingly, with its front face 18 directed toward the user. In the following description, therefore, I will use directional terms such as "upward" and "downward," "horizontal" and "vertical," and derivatives thereof, with this recumbent attitude of the casing 10 in mind. Thus, for instance, the transducer head 12 is held against displacement in any horizontal direction but is movable upward or downward within limits.

Horizontally inserted fully into the casing 10 through the entrance slot 16, the tape cassette 20 will reach the phantom position R of FIG. 1. A cassette shift mechanism transports the tape cassette 20 from this phantom position a predetermined distance D in the direction of an arrow 24, to a position W where the cassette makes proper contact with the transducer head 12 for data transfer therewith. The first recited position R of the tape cassette 20 is what I call the retracted position, where the cassette is away from the transducer head 12. The second position W, then, is the working position where the tape cassette 20 effects data transfer with the transducer head 12. I wish to invite attention to the fact that, not only is the transducer head 12 held stationary for thus establishing data transfer contact with the tape cassette 20, but also the tape cassette is required to travel on one and the same plane predetermined in relation to the height of the transducer head. This feature makes it possible to infallibly move the tape cassette 20 into proper contact with the transducer head 12 by simple and practical means set forth hereafter.

A tape transport mechanism including a pair of motor driven spindles 26, FIG. 1, is normally held retracted away from the path of the tape cassette 20 from its retracted position R to working position W. When the tape cassette 20 reaches the working position W, a tape transport shift mechanism operates to raise the tape transport mechanism into driving engagement with the tape cassette.

The illustrated apparatus further comprises an ejector mechanism including an ejector pushbutton 28, FIG. 2, for ejecting the tape cassette 20 out of the entrance slot 16, and a track selector mechanism for selective use of the tracks of the tape cassette. The following is a more extensive discussion of the above mentioned tape cassette 20, cassette shift mechanism, tape transport mechanism, tape transport shift mechanism, ejector mechanism, and track selector mechanism, under the respective headings, followed by the description of operation of the complete apparatus.

Tape Cassette

With reference to both FIGS. 1 and 3 the magnetic tape cassette 20 for use with the apparatus of my invention can be of standard design having a generally flat, boxlike housing 30. This cassette housing has a pair of opposite main faces 32 and 34 (referred to as the face A and face B respectively), a front side 36, a rear side 38 opposite to the front side, and another pair of opposite sides 40 and 42. Disposed within the housing 30 are a pair of hubs or reels 44 each having a series of internal keys or teeth 46 for positive engagement with the drive spindles 26. The hubs 44 are both supported between the pair of main faces 32 and 34 of the housing for independent rotation about respective axes in parallel spaced relation with each other. A length of magnetic tape 48 has its opposite ends anchored to the respective hubs 44 and is wound thereon for transportation therebetween.

The cassette housing 30 has a series of apertures 50 formed in its front side 36 to partly expose the magnetic tape 48 for data transfer contact with the transducer head 12. Further the cassette housing 30 has defined in its main faces 32 and 34 two holes 52 for the passage of the drive spindles 26 into and out of driving engagement with the hubs 44, a pair of holes 54 for the insertion of guide pins hereinafter set forth, and an additional hole 56. The last mentioned hole 56 is intended for the insertion of a capstan found in the familiar capstan drive cassette players or decks. However, the illustrated embodiment employs a different principle of tape speed control, so that the hole 56 is to receive a light source for photoelectrically sensing the beginning and end of the magnetic tape 48 (BOT and EOT) in this embodiment. The tape speed control system adopted here is described and claimed in U.S. Pat. No. 4,163,532 issued to Yoshiaki Sakai on Aug. 7, 1979 and entitled "Tape Speed Control Servomechanism for a Magnetic Tape Cassette Apparatus."

Seen at 58 in FIG. 1 is a notch formed in the rear side 38 of the cassette housing 30. Located off the midpoint of the housing rear side 38 with respect to its longitudinal direction, the notch 58 is used for discriminating whether or not the tape cassette 20 is being loaded in the apparatus with its face A oriented upwardly. The apparatus is equipped to automatically prevent the loading of the tape cassette 20 if it is inserted in the entrance slot 16 with its face B directed upwardly, as will be later described in more detail.

As will be understood from FIG. 1, the tape cassette 20 is to be inserted in the entrance slot 16 in the direction of a notional line right angularly intersecting the axes of the hubs 44 and with its face A directed upwardly. Consequently, in its retracted position R within the casing 10, the tape cassette 20 has its apertured front side 36 held opposite the data transfer surface 14 of the transducer head 12 with a spacing therebetween. It will be seen from FIG. 2 that the entrance slot 16 approximately corresponds in size and shape to the transverse section of the tape cassette 20.

Cassette Shift Mechanism

Figure 4:
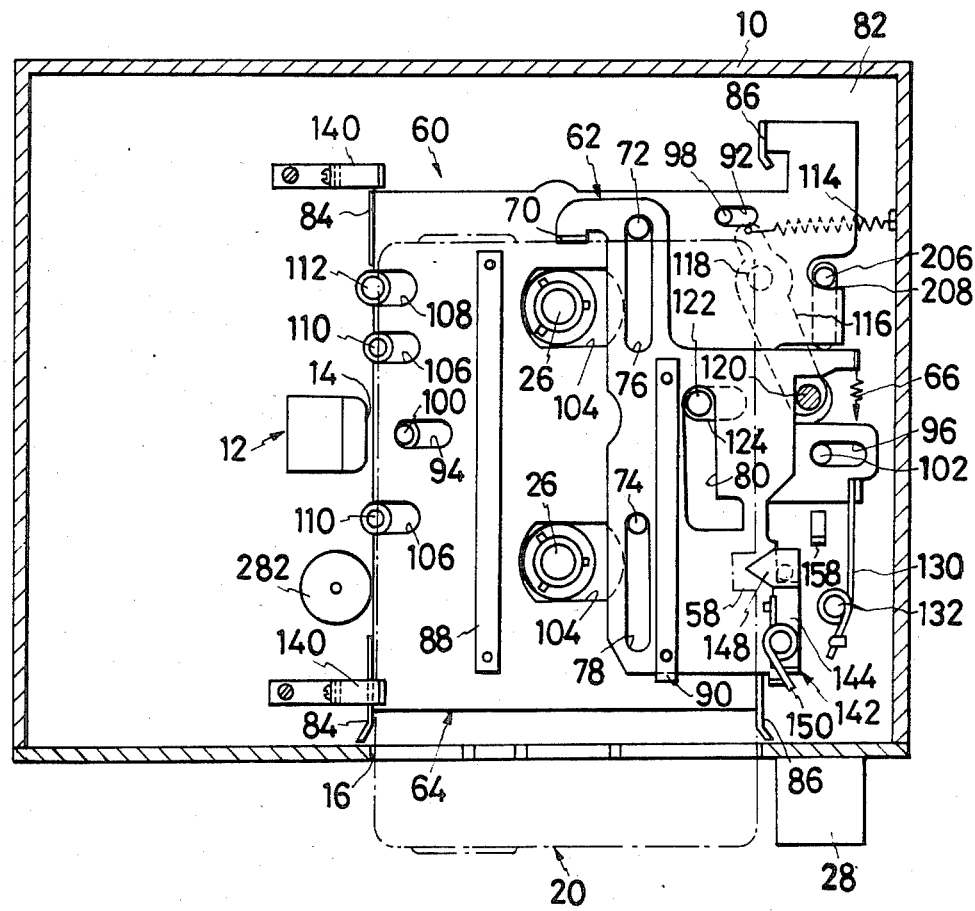
FIG. 4 is a horizontal section through the apparatus, showing in particular the cassette shift mechanism in a state for the insertion, or ejection, of the tape cassette.
Figure 5:
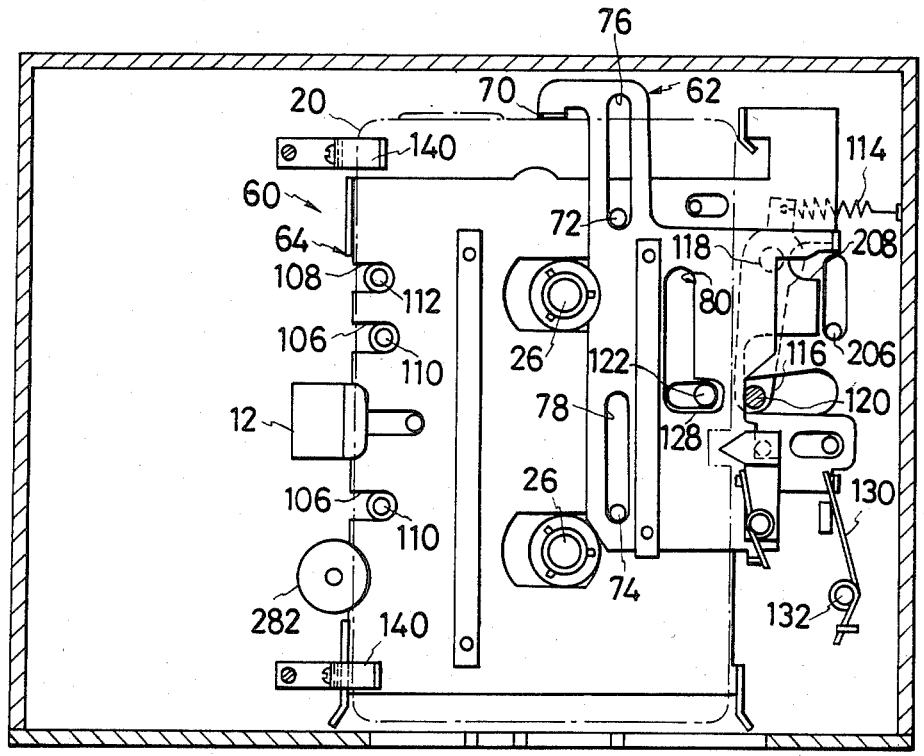
FIG. 5 is a view similar to FIG. 4 except that the cassette shift mechanism is shown in a state for holding the tape cassette in data transfer contact with the magnetic transducer head.

Generally designated 60 in FIGS. 4 and 5, the cassette shift mechanism comprises a first cassette carriage 62 and a second cassette carriage 64. I have illustrated the first cassette carriage 62 by itself in FIG. 6 and the second cassette carriage 64 by itself in FIG. 7. The two cassette carriages are both substantially planar in shape, with the first 62 slidably overlying the second 64.

The first cassette carriage 62 is movable between a position of FIG. 4, close to the entrance slot 16 in the casing 10, and a position of FIG. 5 away from the entrance slot. As will be seen also from FIG. 6, a helical tension spring 66 acts between the first cassette carriage 62 and a spring retainer 68 secured to the casing 10 for normally holding the first cassette carriage in the FIG. 4 position. The first cassette carriage 62 has an upstanding abutment 70 on its end away from the entrance slot 16. Inserted in the entrance slot 16 to an extent indicated by the phantom outline in FIG. 4, the tape cassette 20 comes into contact with the abutment 70. As the tape cassette 20 is subsequently pushed fully to its retracted position R, FIG. 1, the first cassette carriage 62 is moved by and with the tape cassette from its FIG. 4 position to that of FIG. 5 against the bias of the tension spring 66 by sliding over the second cassette carriage 64. It will thus be seen that the FIG. 5 position of the first cassette carriage 62 corresponds to the retracted position R of the tape cassette 20.

In order to guide such linear travel of the first cassette carriage 62, the second cassette carriage 64 has two upright guide pins 72 and 74 planted thereon and slidably engaged in respective aligned guide slots 76 and 78 defined in the first cassette carriage 62. Also defined in the first cassette carriage 62 is an L shaped guide slot 80, to which I will refer later in connection with the second cassette carriage 64.

The second cassette carriage 64 is movable in a direction at right angles with the direction of movement of the first cassette carriage 62, between a position of FIG. 4, away from the transducer head 12, and that of FIG. 5 close to the transducer head. In other words, receiving thereon the inserted tape cassette 20 as the same reaches the retracted position with the first cassette carriage 62, the second cassette carriage 64 transports the tape cassette, as well as the first cassette carriage, from its retracted R to working W position. The second cassette carriage slides over a fixed baseplate 82, FIG. 8, between the FIGS. 4 and 5 positions.

Figure 8:
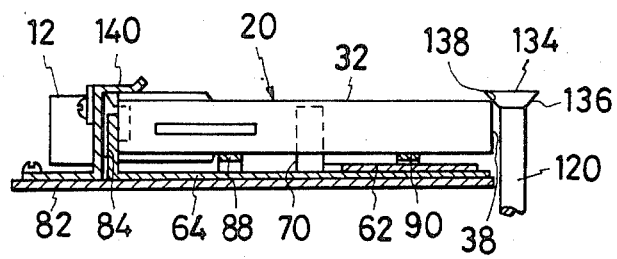
FIG. 8 is a vertical section through the apparatus of FIGS. 1 and 2, showing in particular the first and second cassette carriages holding the tape cassette in its working position, together with means for firmly holding the tape cassette against displacement.
Figure 7:
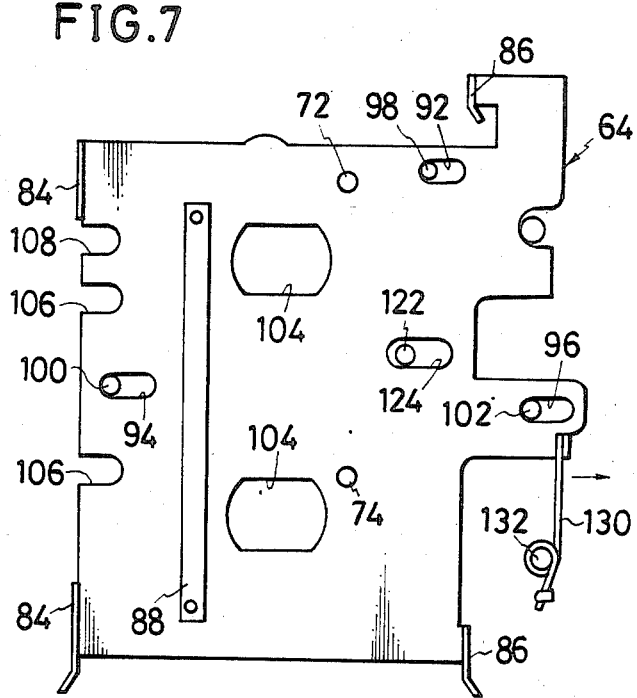
FIG. 7 is a plan view of a second cassette carriage forming another part of the cassette shift mechanism.

As will be seen from FIGS. 4, 7 and 8, the second cassette carriage 64 is formed to include upstanding guide walls 84 and 86 on its opposite sides for guiding the tape cassette 20 as the latter travels to the retracted position R with the first cassette carriage 62. A raised slideway 88 is formed on the second cassette carriage 64, and another similar slideway 90 on the first cassette carriage 62. These slideways 88 and 90 extend parallel to each other and are so arranged as to allow the tape cassette 20 to slide thereover as the same is inserted in the entrance slot 16. Although not illustrated, fixed guides are further provided over the cassette shift mechanism 60 for the determination of the vertical position of the inserted tape cassette in coaction with the slideways 88 and 90. The second cassette carriage 64 has three guide slots 92, 94 and 96 formed therein, with each guide slot extending in the direction of the movement of the second cassette carriage between the FIGS. 4 and 5 positions. Erected on the baseplate 82, guide pins 98, 100 and 102 are slidably received in the respective guide slots 92, 94 and 96 to constrain the second cassette carriage 64 to linear travel toward and away from the transducer head 12.

The second cassette carriage 68 has further defined therein a pair of relatively large apertures 104, a pair of slotlike recesses 106, and another similar recess 108. Disposed approximately centrally of the xecond cassette carriage 68, the pair of apertures 104 allow the respective drive spindles 26 to pass therethrough into and out of driving engagment with the hubs 44 of the tape cassette 20 in the FIG. 5 position. The recesses 106 and 108 are all formed in that edge of the second cassette carriage 68 lying opposite the transducer head 12. The pair of recesses 106 allow guide pins 110 to pass therethrough into and out of engagement in the holes 54, FIG. 1, in the cassette housing 30. The other recess 108 allows a light source 112 for EOT and BOT detection to pass therethrough into and out of engagement in the hole 56 in the cassette housing 30.

For the desired movement of the second cassette carriage 64 from the FIG. 4 to FIG. 5 position with the loaded tape cassette 20, there is provided a helical tension spring 114 having one end anchored to the casing 10 and the other end coupled to one end of a push lever 116. Medially pivoted at 118 for revolution about a fixed vertical axis, the push lever 116 has an upstanding push pin 120 formed on the other end thereof for abutting engagement with the right hand edge, as viewed in FIGS. 4 and 5, of the first cassette carriage 62. As the push lever 116 is sprung in a clockwise direction about its axis 118, the push pin 120 exerts a leftward force on the first cassette carriage 62.

The first cassette carriage 62 is engaged as aforesaid with the second cassette carriage 64 via the guide pins 72 and 74 on the latter slidably engaged in the guide slots 76 and 78 in the former. Thus, while the first cassette carriage 62 is movable relative to the second cassette carriage 64 in the front to rear depth direction of the casing 10, the first cassette carriage is constrained to joint travel with the second cassette carriage toward and away from the transducer head 12. Accordingly the tension spring 114 is effective to bias both first 62 and second 64 cassette carriages toward the transducer head 12.

Figure 6:
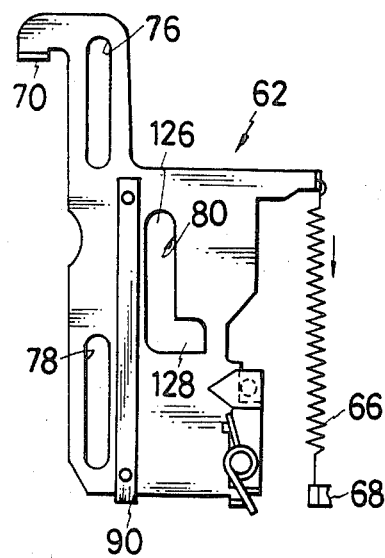
FIG. 6 is a plan view of a first cassette carriage forming a part of the cassette shift mechanism of FIGS. 4 and 5.

However, the cassette carriages 62 and 64 must both be held in the FIG. 4 position, away from the transducer head 12, before and during the insertion of the tape cassette 20 and must both travel toward the transducer head only upon full insertion of the tape cassette. Provided to this end are locking means comprising a lockpin 122 erected on the baseplate 82 and slidably passing through a slot 124 in the second cassette carriage 64 to be slidably engaged in the aforesaid L shaped guide slot 80 in the first cassette carriage 62. The slot 124 in the second cassette carriage 64 is elongated in such a direction that the second cassette carriage is movable toward and away from the transducer head 12 irrespective of the presence or absence of the lockpin 122. It is the L shaped guide slot 80 in the first cassette carriage 62 that coacts with the lockpin 122 to control the movement of both cassette carriages 62 and 64 between the FIGS. 4 and 5 positions. As indicated in FIG. 6, the guide slot 80 has a relatively long first portion 126 and a shorter second portion 128. The longer first portion 126 of the guide slot 80 extends in the direction in which the tape cassette 20 is inserted in the entrance slot 16, and the shorter second portion 128 is bent right angularly, in a direction away from the transducer head 12, from the extremity of the first portion closer to the entrance slot. The shorter second portion 128 is in register with the slot 124 in the second cassette carriage 64 when the first cassette carriage 62 is in the FIG. 5 position with respect to the second cassette carriage.

Thus, normally, the lockpin 122 is engaged in the longer first portion 126 of the guide slot 80, as in FIG. 4, holding both cassette carriages 62 and 64 in the illustrated positions in opposition to the effect of the tension spring 114. As the tape cassette 20 is inserted and pushed toward the retracted position R of FIG. 1, the lockpin 122 relatively moves along the first guide slot portion 126 thereby allowing the first cassette carriage 62 to travel with the inserted tape cassette from its FIG. 4 position to that of FIG. 5 with respect to the second cassette carriage 64. The lockpin 122 enters the shorter second guide slot portion 128 upon full insertion of the tape cassette 20 and so allows both cassette carriages 62 and 64 to travel to the FIG. 5 position together with the tape cassette under the bias of the tension spring 114.

At 130 in FIGS. 4, 5 and 7 is shown a torsion spring coiled around a fixed post 132 and having one end engaged with the second cassette carriage 64. The torsion spring 130 biases the second cassette carriage 64 rightwardly for returning the same from its FIG. 4 position to that of FIG. 5 together with the first cassette carriage 62 and tape cassette 20. The force of this return spring 130 is less than that of the tension spring 114, so that the latter can move the cassette carries 62 and 64 and tape cassette 20 toward the transducer head 12 against the counteracting force of the return spring 130. Only when the push lever 116 is pivoted counterclockwise from its FIG. 5 position against the force of the tension spring 114, by the ejector mechanism to be detailed subsequently, the return spring 130 acts to return the cassette carriages 62 and 64 and tape cassette 20 to their FIG. 5 position.

Preferably, and as shown in FIG. 8, the push pin 120 on the push lever 116 has a head 134 having a conical surface 136 for direct abutment against the edge 138 forming the boundary between the top face 32 and rear side 38 of the tape cassette 20 on the cassette carriages 62 and 64. With the headed push pin 120 thus pressed against the edge 138 of the tape cassette 20, the force of the tension spring 114 resolves itself into a component pushing the cassette toward the transducer head 12 and another component pushing the cassette downwardly against the carriages 62 and 64. This makes it possible to hold the tape cassette 20 more stably on the carriages 62 and 64.

FIGS. 4, 5 and 8 show at 140 a pair of cassette retainers of springy material mounted on the baseplate 82 for engaging the tape cassette 20 as the latter is transported to the working position W. These cassette retainers coact with the push pin 120 for firmly holding the tape cassette 20 in the working position during data transfer with the transducer head 12.

Structurally associated with the carriage shift mechanism 60 is a cassette rejector mechanism best illustrated in FIG. 9 and therein generally designated 142. As I have stated, the illustrated apparatus is designed to allow data transfer with the tape cassette 20 only when the same is loaded with its face A directed upwardly as in FIG. 1. It is desirable, then, that the tape cassette be automatically rejected when inserted in the entrance slot 16 with its face B directed upwardly as in FIG. 9. The cassette rejector mechanism 142 performs this function.

Included in the cassette rejector mechanism 142 is a sensor arm 144 proximally mounted on a pivot pin 146 on the first cassette carriage 62 of the cassette shift mechanism 60 for pivotal motion in a horizontal plane. The sensor arm 144 has an offset tip 148 on its distal end movable into and out of engagement in in the notch 58 in the rear side 38 of the housing 30 of the tape cassette 20 properly inserted in the entrance slot 16 with its face A oriented upwardly. Coiled around the pivot pin 146, a torsion spring 150 has one end held against a lug 152 formed integral with the first cassette carriage 62 and another end held against a lug 154 formed integral with the sensor arm 144, so that the sensor arm is sprung in a counterclockwise direction as viewed in FIG. 9. The counterclockwise turn of the sensor arm 144 is limited in the position of FIG. 6 as a downward projection 156 on the sensor arm 144 butts on the right hand edge of the first cassette carriage 62. A stop 158 is formed on the baseplate 82. The sensor arm 144 is to butt on, or pass, the stop 158 depending upon whether its tip 148 is engaged or not engaged in the notch 58 in the cassette housing 30.

When the tape cassette 20 is properly inserted in the entrance slot 16, with its face A directed upwardly and with its apertured front side 36 oriented toward the transducer head 12, into contact with the abutment 70 on the first cassette carriage 62, as indicated by the phantom outline in FIG. 4, the offset tip 148 of the sensor arm 144 will become engaged in the notch 58 in the cassette housing 30 under the bias of the torsion spring 150. Consequently, as the tape cassette 20 is subsequently pushed further into the casing 10 against the force of the tension spring 66, the sensor arm 144 will travel with the tape cassette and first cassette carriage 62 past the stop 158, enabling the tape cassette to reach the retracted position as in FIG. 5.

However, if the tape cassette 20 is inserted with its face B oriented upwardly as in FIG. 9, the sensor arm 148 will not be engaged in the notch 58 in the cassette housing 30, but will be held turned clockwise against the force of the torsion spring 150, when the tape cassette hits the abutment 70 on the first cassette carriage 62. The sensor arm 148 will then butt on the stop 158 if the user attempts to push the tape cassette 20 further into the casing 10, preventing the cassette, as well as the first cassette carriage 62, to move further toward the retracted position. The user may then withdraw the tape cassette 20 out of the entrance slot 16, turn the cassette upside down to direct its face A upwardly, and reinsert the cassette in the entrance slot.

Tape Transport Mechanism

Figure 11:
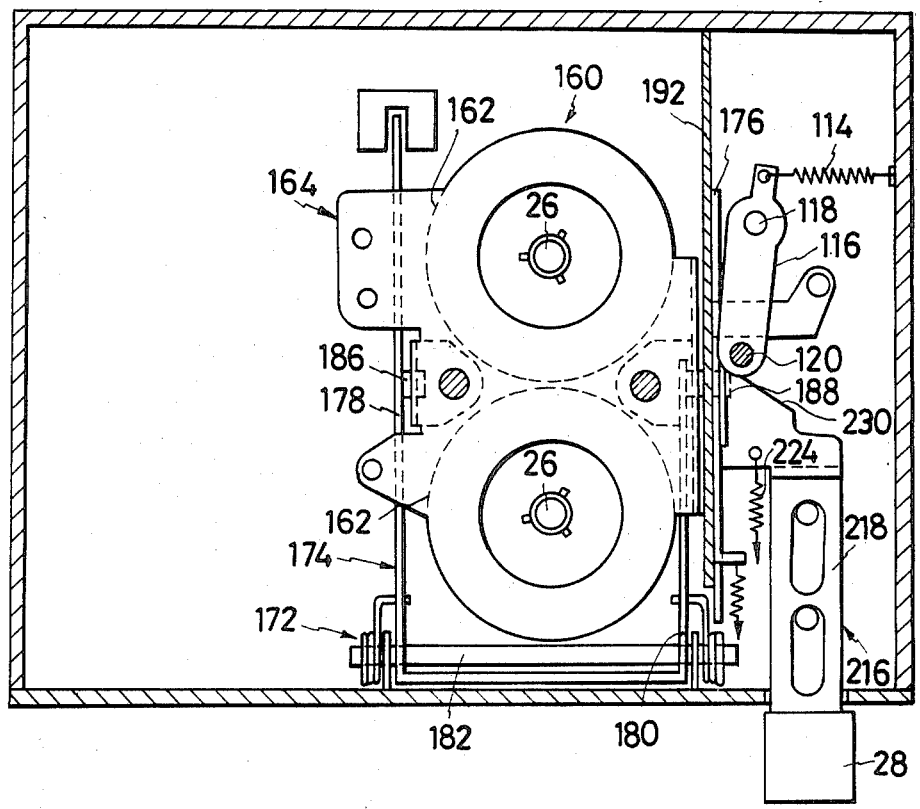
FIG. 11 is a view similar to FIG. 10 except that the ejector mechanism is shown in its normal state.

Generally labelled 160 in FIGS. 10 and 11, the tape transport mechanism comprises a pair of bidirectional electric drive motors 162 coupled directly to the aforesaid drive spindles 26. The drive motors 162 are both disposed under and mounted to a tape transport carriage 164, with the drive spindles 26 extending upwardly therefrom, although this tape transport carriage might be considered a part of the tape transport shift mechanism to be detailed presently. The tape transport carriage 164 has also mounted thereon the pair of guide pins 110 and the light source 112.

Figure 12:
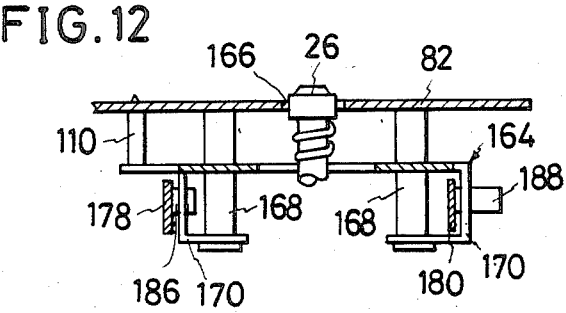
FIG. 12 is a vertical section through the apparatus, taken along the line 12—12 in FIG. 10 and showing in particular parts of the tape transport mechanism and tape transport shift mechanism.
Figure 13:
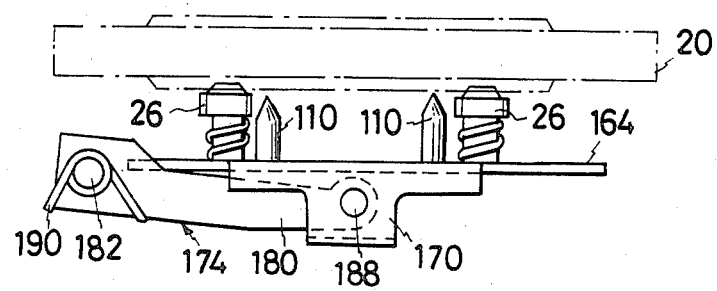
FIG. 13 is a right hand side elevation, as seen in FIGS. 10, 11 and 12, of the tape transport mechanism and tape transport shift mechanism in a state wherein the tape transport mechanism is out of driving engagement with the tape cassette lying in its working position.

As illustrated in a vertical section in FIG. 12, the tape transport carriage 164 underlies the fixed baseplate 82 and is movable up and down relative to the same to carry the pair of drive spindles 26 into and out of driving engagement with the hubs 44 of the tape cassette 20 through respective apertures, one seen at 166, in the baseplate 82. The tape transport carriage 164 is shown in FIG. 13 in its lower or retracted position with respect to the tape cassette 20 lying in its working position, and in FIG. 14 in its raised or working position with respect to the tape cassette. For guiding such up and down motion of the tape transport carriage 164 with the tape transport mechanism 160, the base plate 82 has a pair of guide rods, seen at 168 in FIGS. 10 and 12, depending therefrom and slidably extending through the tape transport carriage 164 and through a pair of L shaped lugs 170 depending therefrom.

Tape Transport Shift Mechanism

Figure 14:
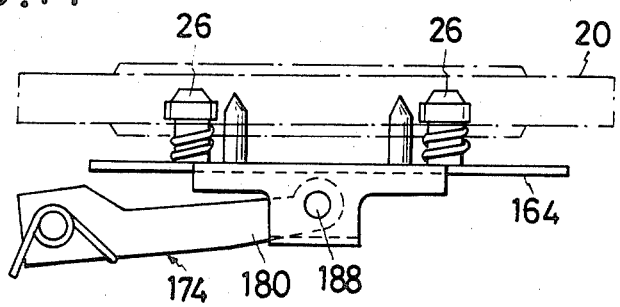
FIG. 14 is a view similar to FIG. 13 except that the tape transport mechanism is shown in driving engagement with the tape cassette.

The tape transport shift mechanism, generally designated 172 in FIGS. 10 and 11, functions to automatically move the tape transport mechanism 160, and therefore the tape transport carriage 164, from the FIG. 13 position to that of FIG. 14 when the tape cassette 10 reaches the working position W of FIG. 1. The primary components of the tape transport shift mechanism 172 are a cam follower lever assembly 174 and a cam 176.

As will be observed from FIGS. 10 and 11, the cam follower lever assembly 174 takes the form of a U shaped member providing a pair of parallel spaced levers 178 and 180 underlying the tape transport carriage 164 and pivoted on a common pin or rod 182. This pivot pin is supported horizontally between a pair of lugs 184 secured to the casing 10, so that the cam follower levers 178 and 180 are pivotable between the positions of FIGS. 13 and 14. The cam follower levers 178 and 180 have pins 186 and 188 projecting laterally therefrom into engagement with the depending lugs 170 of the tape transport carriage 164, so that the pivotal motion of the cam follower levers about the horizontal axis can be translated into the up and down motion of the tape transport carriage together with the tape transport mechanism 160 mounted thereto. A pair of torsion springs 190 on the pivot pin 182 conjointly bias the cam follower levers 178 and 180 upwardly, or in a counterclockwise direction as viewed in FIGS. 13 and 14.

The cam 176 functions to pivot the cam follower lever assembly 174 from its FIG. 13 position to that of FIG. 14 in response to the movement of the movement of the tape cassette 20 to the working position W together with the first 62 and second 64 cassette carriages. The cam 176 is slidably mounted to a fixed guide wall 192 within the casing 10 extending in the direction in which the tape cassette is inserted in the entrance slot.

Figure 17:
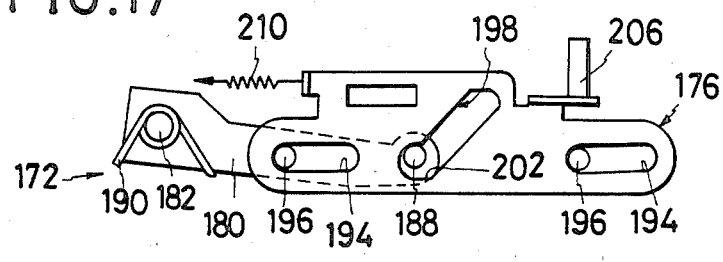
FIG. 17 is a right hand side elevation, as seen in FIGS. 10 and 11, of the cam and associated cam follower lever assembly shown in a state for holding the tape transport mechanism out of driving engagement with the tape cassette.
Figure 18:
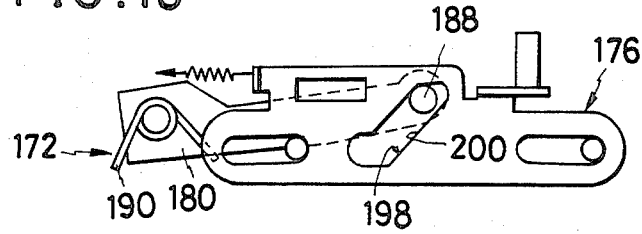
FIG. 18 is a view similar to FIG. 17 except that the cam and cam follower are shown in a state for holding the tape transport mechanism in driving engagement with the tape cassette.

As better illustrated in FIGS. 15 and 16, the cam 176 takes the form of a rather elongate plate having formed therein two guide slots 194 slidably receiving guide pins 196 on the fixed guide wall 192 thereby to be constrained to horizontal travel between the two positions illustrated in FIGS. 17 and 18. Defined approximately centrally in the cam 176 is a cam slot 198 slidably receiving the pin 188 on the right hand lever 180 of the cam follower lever assembly 174. The cam slot 198 has a sloping portion 200 and a horizontal portion 202 extending to a comparatively short extent from the lower extremity of the sloping portion. The cam 176 is formed to include a carrier arm 204 extending laterally therefrom and having an upstanding lockpin 206 rigidly mounted thereon. As will be seen by referring back to FIGS. 4 and 5, the lockpin 206 is engaged in a notch 208 in the second cassette carriage 64 when the latter is in the FIG. 4 position, and becomes disengaged from the notch 208 when the second cassette carriage moves to the FIG. 5 position. A helical tension spring 210 energizes the cam 176 toward the entrance slot in the casing 10.

It will thus be seen that the cam 176 travels between the position of FIGS. 10 and 17 and that of FIG. 11 and 18 as guided by the guide pins 196 sliding along the guide slots 194 in the cam. Although biased by the tension spring 210 from the FIG. 10 and 17 position toward that of FIGS. 11 and 18, the cam 176 stays in the FIGS. 10 and 17 position against the bias of the tension spring 210 when the lockpin 206 thereon is engaged in the notch 208 in the second cassette carriage 64 as in FIG. 4, with the latter holding the tape cassette 20 in its retracted position away from the transducer head 12. When the cam 176 is in this FIGS. 10 and 17 position, the pin 188 on the cam follower lever assembly 174 is engaged in the horizontal portion 202 of the cam slot 198. Consequently the cam follower lever assembly 174 is held lowered to its FIG. 13 position against the forces of the torsion springs 190, thereby holding the drive spindles 26 retracted away from the plane of the tape cassette 20.

When the second cassette carriage 64 travels under the bias of the tension spring 114 from its FIG. 4 position to that of FIG. 5 to carry the tape cassette 20 to its working position, the lockpin 206 on the cam 176 becomes disengaged from the notch 208 thereby allowing the cam to travel from its FIGS. 10 and 17 position to that of FIGS. 11 and 18 under the bias of the tension spring 210. During such travel of the cam 176 the pin 188 on the cam follower lever 180 relatively slides upwardly along the sloping portion 200 of the cam slot 198 and so allows the cam follower lever assembly 174 to pivot from its FIG. 13 position to that of FIG. 14 under the bias of the torsion springs 190. With the tape transport carriage 164 thus raised by the cam follower lever assembly 174, the pair of drive spindles 26 thereon move into driving engagement with the hubs of the tape cassette 20 lying in its working position.

At 212 in FIG. 10 there is shown an optical sensor assembly of conventional design disposed opposite an extension 214 of the cam follower lever 178. The sensor assembly 212 photoelectrically senses the engagement of the drive spindles 26 with the cassette hubs from the position of the cam follower lever extension 214.

Ejector Mechanism

Figure 19:
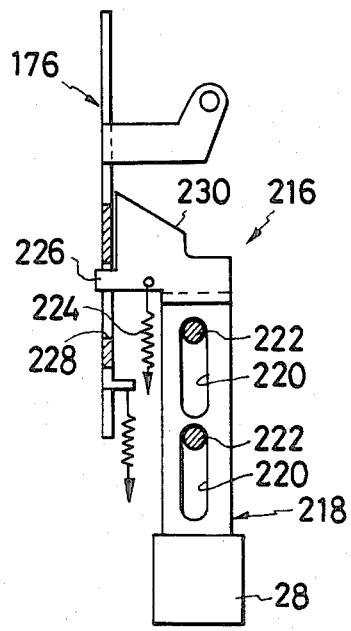
FIG. 19 is a plan view, partly in a horizontal section, of the ejector mechanism.

Reference is directed to FIGS. 10, 11 and 19 for a study of the ejector mechanism, therein generally indicated by the numeral 216. It includes an ejector member 218 extending parallel to the cam 176 and having the aforesaid ejector pushbutton 28 terminating one end thereof.

As best seen in FIG. 19, the ejector member 218 is in the form of an elongate plate or strip having formed therein two longitudinal guide slots 220 slidably receiving fixed guide pins 222. A helical tension spring 224 urges the ejector member 218 toward the front panel 18 of the casing 20, normally holding the ejector member in the position of FIGS. 10 and 11 with respect to the casing. The ejector member 218 has a lateral projection 226 engaged in a slot 228 in the cam 176, with the slot being shown also in FIG. 16. Further the ejector member 218 is formed to include a sloping cam edge 230 for sliding engagement with the push, pin 120 on the push lever 116.

The ejector pushbutton 28 is to be depressed upon completion of data transfer between transducer head 12 and tape cassette 20, when the apparatus is in the state of FIG. 5. The depression of the ejector pushbutton 28 results, first of all, in the movement of the cam 176 from its FIG. 18 position to that of FIG. 17 against the force of the tension spring 210, so that the drive spindles 26 of the tape transport mechanism 120 descends from their FIG. 14 to FIG. 13 position. Further, upon depression of the pushbutton 28, the cam edge 230 of the ejector member 218 will turn the push lever 116 from its FIGS. 5 and 11 position to that of FIGS. 4 and 10 against the force of the tension spring 114, allowing the tape cassette 20 to turn from its working W to retracted R position with the first 62 and second 64 cassette carriages. Thereafter the tape cassette 20 will be ejected from the entrance slot 16 by the first cassette carriage 62.

Track Selector Mechanism

Figure 20:
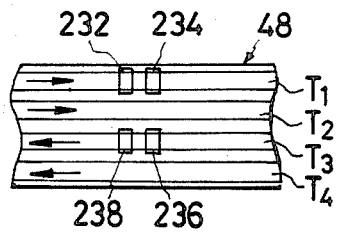
FIG. 20 is a diagrammatic representation of the record tracks on the magnetic tape of the tape cassette, and of the arrangement of two pairs of write and read head segments of the transducer head for use with the multitrack tape, in the apparatus of FIGS. 1 and 2.

As illustrated in detail in FIG. 20, the magnetic tape 48 of the multitrack tape cassette 20 intended for use with the illustrated apparatus has four record tracks T1, T2, T3 and T3 spaced from one another in the width direction of the tape. The transducer head 12 for use with the four track tape 48 has a first pair of write head segment 232 and read head segment 234 arranged side by side in the longitudinal direction of the tape, and a second pair of write head segment 236 and read head segment 238 arranged under the read head segment 234 and write head segment 232 respectively.

For the selective use of the four record tracks T1 through T4 of the magnetic tape 48, the transducer head 12 may be moved up and down, or in the width direction of the tape. When in a raised position, the transducer head 12 has its first pair of write 232 and read 234 head segments held opposite the first track T1, and its second pair of write 236 and read 238 head segments held opposite the third track T3. When the transducer head is lowered, the first pair of head segments 232 and 234 are held opposite the second track T2, and the second pair of head segments 236 and 238 opposite the fourth track T4. The tape 48 is to be run rightwardly for data transfer by the first pair of head segments 232 and 234, and leftwardly for data transfer by the second pair of head segments 236 and 238.

Figure 21:
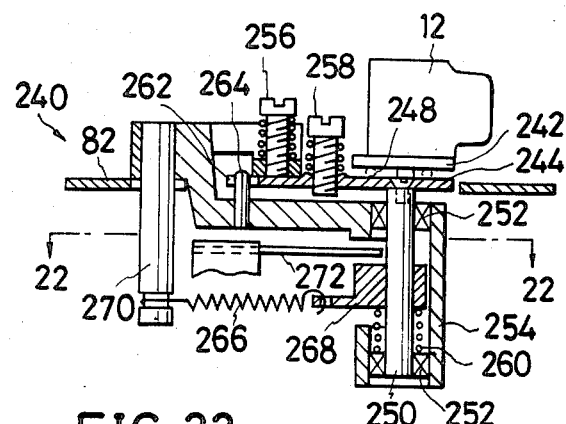
FIG. 21 is a fragmentary vertical section through the apparatus, showing the track selector mechanism for moving the transducer head up and down for selective use of the record tracks on the magnetic tape of FIG. 20.
Figure 22:
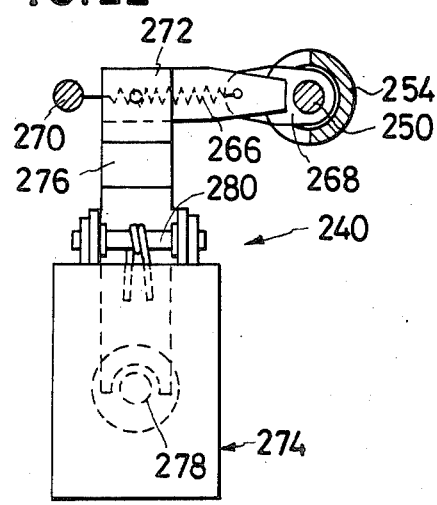
FIG. 22 is a horizontal section through the track selector mechanism, taken along the line 22—22 in FIG. 21.
Figure 23:
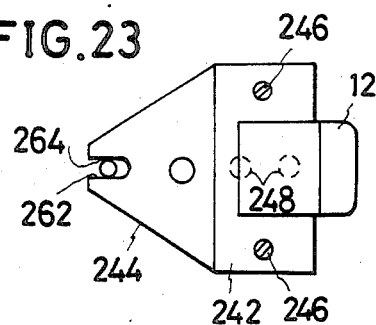
FIG. 23 is a partial top plan view of the track selector mechanism.

FIGS. 21, 22 and 23 are illustrations of the track selector mechanism 240 for moving the transducer head 12 up or down for the selective use of the four tracks T1 through T4 of the magnetic tape 48.

The transducer head 12 is fixedly mounted on a standard 242, which in turn is mounted on a floating platform 244 and connected thereto by a pair of screws 246, FIG. 23, with two bearing balls 248 of steel or like material interposed therebetween. The screws 246 are intended for the azimuth adjustment of the transducer head 12. The floating platform 244 has a shaft 250 depending therefrom and supported via two axial bearings 252 by a head support 254 secured to the baseplate 82, so that the transducer head 12 is movable up and down with the shaft 250. A screw 256 determines the upper limit of the floating platform 244, and another screw 258 determines its lower limit. Sleeved upon the shaft 250, a helical compression spring 260 urges the transducer head 25 upwardly. The floating platform 244 is slotted at 262 to engage a lockpin 264 on the head support 254, thereby to be locked against angular displacement. A helical tension spring 266 extends between a retainer 268 rigidly mounted on the shaft 250 and another retainer 270 secured to the baseplate 82, for energizing the transducer head 12 rightwardly or toward the tape cassette.

Overhanging the retainer 268 on the shaft 250 is an actuator arm 272 to be driven by a solenoid 274, FIG. 22, for lowering the transducer head 25 against the force of the compression spring 260. The actuator arm 272 is secured to one end of a link 276 which is operatively engaged at the other end with the plunger 278 of the solenoid 274. Pivotally mounted on a pin 280, the link 276 transmits the extension and contraction of the solenoid 274 to the actuator arm 272.

Thus, in the arrangement of FIGS. 20 through 23, the first pair of head segments 232 and 234 are on the first track T1, and the pair of head segments 236 and 238 on the third track T3, when the solenoid 274 is unenergized. Upon energization of the solenoid 274, then, the first pair of head segments 232 and 234 move to the sound track T2, and the second pair of head segments 236 and 238 to the fourth track T4.

OPERATION

Cassette Loading

The tape cassette 20 may be inserted into the casing 10 through the entrance slot 16 in its front panel 18, with its face A directed upwardly and with its apertured front side 36 oriented toward the transducer head 12. The cassette carriages 62 and 64 of the cassette shift mechanism 60, as well as other pertinent parts of the apparatus, will be in the state of FIG. 4 during the insertion of the tape cassette 20. Guided by the upstanding guide walls 84 and 86 on the second cassette carriage 64, the tape cassette 20 will strike the abutment 70 on the first cassette carriage 62 when inserted to the extent indicated in FIG. 4.

At this time, if the tape cassette 20 has been inserted in the correct orientation with respect to the casing 10 as set forth above, the offset tip 148 of the sensor arm 144 of the cassette rejector mechanism 142 will become engaged in the notch 58 in the rear side of the cassette housing under the bias of the torsion spring 150. Then the cassette rejector mechanism 142 will allow the tape cassette 20 to be pushed further into the casing 10. However, should the tape cassette be inserted with its face B directed upwardly, the sensor arm 144 will be unable to engage in the notch 58 when the cassette strikes the abutment 70 on the first cassette carriage 62, as illustrated in FIG. 9. Thus held out of engagement in the notch 58, the sensor arm 144 will engage the stop 158 on the baseplate 82, preventing the cassette to travel further into the casing 10 with the first cassette carriage 62.

As the correctly inserted tape cassette 20 is pushed further into the casing 20 from its FIG. 4 position, the first cassette carriage 62 will travel therewith against the bias of the tension spring 66 as guided by the guide pins 72 and 74 on the second cassette carriage 64 slidably engaged in the respective guide slots 76 and 78 in the first cassette carriage. The lockpin 122 slidably engaged in the L shaped slot 80 in the first cassette carriage 62 will reach its shorter second portion 128 upon full insertion of the tape cassette to the retracted position R.

Then, no longer restrained from leftward travel by the lockpin 122, the first cassette carriage 62 will travel to the FIG. 5 position with the tape cassette 20 as the push pin 120 on the push lever 116 pushes the first cassette carriage under the force of the tension spring 114. The second cassette carriage 64 will also travel with the first cassette carriage 62 to its FIG. 5 position as the former is engaged with the latter via the guide pins 72 and 74. Although the torsion spring 130 acts on the second cassette carriage 64 to resist its leftward travel, the force of this torsion spring is less than that of the tension spring 114.

Now the tape cassette 20 is in the working position W, with its magnetic tape 48 held against the data transfer surface 14 of the transducer head 12 via one of the apertures 50 in the front side 36 of the cassette housing 30. The tape 48 is also held against a tape speed sensor roll 282, FIG. 5, through another of the apertures 50. As best seen in FIG. 8, the tape cassette 20 in this working position has its front side resiliently engaged by the pair of cassette retainers 140 on the base plate 82, and its rear edge 138 caught by the conical head 134 of the push pin 120 under the force of the tension spring 114. There is accordingly no possibility of cassette displacement in any direction during the subsequent process of data transfer.

The second cassette carriage 64 on its travel from the FIG. 4 position to that of FIG. 5 will disengage the lockpin 206 on the cam 176 from its notch 208. Thereupon the cam 176 will travel from its FIG. 17 position to that of FIG. 18 under the bias of the tension spring 210, allowing the cam follower lever assembly 174 to pivot from its FIG. 17 position to that of FIG. 18 as the pin 188 on the cam follower lever 180 slides upwardly along the sloping portion 200 of the cam slot 198. This pivotal motion of the cam follower lever assembly 174 is aided by the pair of torsion springs 190.

Thus, under the force of these torsion springs 190, the tape transport carriage 164 will move from its FIG. 13 position to that of FIG. 14, with the result that the pair of drive spindles 26 become engaged in the hubs 44 of the tape cassette 20. Further the guide pins 110 on the tape transport carriage 164 will be received in the holes 54 in the cassette housing 30, and the light source 112 on the tape transport carriage will be received in the hole 56 in the cassette housing. Now the tape cassette 20 is ready for data transfer with the transducer head 12.

Data Transfer

Upon engagement of the drive spindles 26 with the cassette hubs 44 the sensor assembly 211 will sense this face from the position of the extension 214 of the cam follower lever 178 and produce an electric signal indicative of the fact that the apparatus is ready for the commencement of data transfer.

The magnetic tape 48 within the cassette housing 30 is to be run in either direction by either of the drive motors 162. The illustrated apparatus has no capstan or pinch roller, as has been stated, but has the speed sensor roll 282 forming a part of the tape speed control servomechanism described and claimed in the aforementioned Sakai U.S. Pat. No. 4,163,532. In response to the actual tape speed sensed by the roll 282 the servomechanism will control the drive motors 162 accordingly, affording constant tape speed as well as proper tape tension. The four record tracks of the magnetic tap 48 shown in FIG. 20 may be used for data transfer in the order of third track T3, second track T2, fourth track T4, and first track T1.

Cassette Ejection

All that the operator needs to do for the ejection of the tape cassette upon completion of data transfer is to depress the ejector pushbutton 28. Upon depression of this pushbutton the ejector member 218 will travel against the bias of the tension spring 224. The ejector member 218 has the lateral projection 226 engaged in the slot 228 in the cam 176, so that this cam will travel with the ejector member in opposition to the force of the tension spring 210 from its FIG. 18 position back to that of FIG. 17. During such reverse travel the cam 176 will cause the cam follower lever assembly 174 to pivot in a clockwise direction, as viewed in FIGS. 17 and 18, against the force of the torsion springs 190 by causing the pin 188 on the cam follower lever 180 to slide down the cam slot 198. Consequently the tape transport carriage 164 will descent from its FIG. 14 position back to that of FIG. 13 thereby moving the drive spindles 26, guide pins 110, and light source 112 out of engagement with the tape cassette 20.

The depression of the ejector pushbutton 28 will result also in the pivotal motion of the push lever 116 from its FIG. 11 position to that of FIG. 10 against the bias of the tension spring 114 as the sloping cam edge 230 of the ejector member 218 acts on the push pin 120 on the push lever.

Thus released from the force of the tension spring 114, the second cassette carriage 64 will return from its FIG. 5 position back to that of FIG. 4 with respect to the casing 10 under the bias of the torsion spring 130 together with the tape cassette 20 and first cassette carriage 62. Then the first cassette carriage 62 will travel under the bias of the tension spring 66 relative to the second cassette carriage 64 toward the entrance slot 16 together with the tape cassette 20, thereby partly ejecting the tape cassette out of the entrance slot as in FIG. 4.

Upon return of the second cassette carriage 64 to the FIG. 4 position the lockpin 206 on the cam 176 will become reengaged in the slot 208 in the second cassette carriage. Accordingly, when the ejector pushbutton 28 is released subsequently, the cam 176 will remain in its FIG. 17 position with respect to the cam follower lever assembly 174 against the effect of the tension spring 210. The apparatus will thus be held standing by for the insertion of the next tape cassette.

The above described embodiment yields the following advantages, in addition to those already set forth in the summary of my invention:

1. The invention of the cassette shift mechanism 60 is related to that of the tape transport shift mechanism 172 by the cam 176 with its lockpin 206, in such a manner that the tape transport shift mechanism automatically moves the pair of drive spindles 26 into driving engagement with the cassette hubs 44 immediately upon movement of the tape cassette 20 from its retracted to working position.

2. The travel of the first cassette carriage 62 with the tape cassette 20 to its retracted position automatically triggers the travel of the second cassette carriage 64 with the tape cassette from its retracted to working position, so that the operator needs merely to insert the cassette fully in the entrance slot 16 for the proper engagement of the cassette with the transducer head and of the drive spindles with the cassette hubs.

3. As the tape cassette 20 is inserted lengthwise in the entrance slot 16, the push lever 116 (with the associated spring 114 and push pin 120) and cassette rejector mechanism 142 which must both be disposed on the rear side of the tape cassette, can be disposed some distance away from the entrance slot for the easy loading and unloading of the tape cassette.

4. The insertion of the tape cassette 20 with its face B upward can be positively prevented by the cassette rejector mechanism during, rather than after, the insertion of the tape cassette.

5. The tape cassette 20 can be firmly retained in its working position particularly as the push pin 120 with its conical head 134 presses the cassette both downwardly and toward the transducer head under the force of the tension spring 114.

6. In the track selector mechanism 240 the spring 266 energizes the transducer head 12 in a predetermined direction via the shaft 250 depending from its floating platform 244, so that the head can be maintained at a constant angle with respect to the magnetic tape 48 of the cassette 20 in spite of changes in its vertical position.

Possible Modifications

Although I have shown and described the magnetic tape cassette apparatus in accordance with my invention terms of but one embodiment thereof, it is understood that it merely represents an example of construction the apparatus may take in practice. A variety of modifications or alterations of the illustrated embodiment will readily occur to one skilled in the art within the broader scope due to my invention. The following, then, is a brief list of such possible modifications:

1. The track selector mechanism 240 is not an essential feature of my invention; therefore, for use with single track tape cassettes, the transducer head may be locked against movement in any direction relative to the casing.
2. The running speed of the magnetic tape could be detected by means other than the speed sensor roll 282.
3. The second cassette carriage 64 could be box shaped to receive the tape cassette against displacement relative to the same.
4. The tape cassette could be loaded vertically rather than horizontally.
5. The cassette rejector mechanism 142 could be eliminated to allow the loading of the tape cassette with its face B upward.

I claim:

1. An apparatus for data transfer with a magnetic tape cassette of the type having a generally flat boxlike housing accommodating a length of magnetic tape for transportation between a pair of hubs mounted within the housing for independent rotation about respective axes arranged in parallel spaced relationship with each other, the tape being exposed through an aperture in a predetermined front side of the housing extending parallel to a notional line right angularly intersecting the axes of rotation of the hubs, the apparatus comprising:

(a) a casing having defined therein an entrance opening through which the tape cassette is to be inserted into the casing in the direction of the notional line right angularly crossing the axes of rotation of the hubs of the tape cassette, the tape cassette lying in a preassigned retracted position within the casing upon full insertion therein through the entrance opening;

(b) a transducer head mounted within the casing and having a data transfer surface so oriented as to confront with a spacing therebetween the apertured front side of the housing of the tape cassette lying in the retracted position, the transducer head being immovable relative to the casing at least in a direction normal to the data transfer surface thereof;

(c) cassette shift means for reciprocably moving the loaded tape cassette relative to the casing in the principal plane of the loaded cassette and in a direction normal to the notional line between the retracted position and a preassigned working position, the tape cassette when in the working position having its tape in contact with the data transfer surface of the transducer head for data transfer therewith through the apertured front side of the housing of the cassette, said cassette shift means comprising:

a first cassette carriage movable between a first position close to the entrance opening in the casing and a second position away from the entrance opening, the first cassette carriage being normally held in the first position and being moved to the second position by and with the tape cassette upon insertion thereof to the retracted position within the casing;

a second cassette carriage coacting with the first cassette carriage for holding thereon the tape cassette as the latter reaches the retracted position with the first cassette carriage, the second cassette carriage being movable with the tape cassette between a third position for receiving the tape cassette in its retracted position and a fourth position for holding the tape cassette in its working position;

resilient means for biasing the second cassette carriage from the third toward the fourth position; and locking means for normally holding the second cassette in the third position against the bias of the resilient means, the locking means allowing the second cassette carriage to travel from the third to the fourth position under the bias of the resilient means upon movement of the first cassette carriage from the first to the second position with the tape cassette;

(d) tape transport means comprising a pair of drive spindles extending perpendicular to the principal plane of the loaded tape cassette for linear movement into and out of driving engagement with the respective hubs of the tape cassette when the latter is in the working position; and (e) tape transport shift means for reciprocably moving the tape transport means in order to cause the linear movement of the drive spindles thereof into and out of driving engagement with the respective hubs of the tape cassette lying in the working position.

2. The apparatus of claim 1 wherein the first cassette carriage of the cassette shift means is coupled to the second cassette carriage so as to be movable relative to the same between the first and second positions while being constrained to joint travel with the second cassette carriage toward and away from the transducer head as the second cassette carriage moves between the third and fourth positions, and wherein the locking means of the cassette shift means comprises:

(a) a locking member mounted in a fixed relation to the casing; and (b) there being an L shaped guide slot in the first cassette carriage for slidably receiving the locking member, the L shaped guide slot being adapted to hold, via the locking member, the first and second cassette carriages against movement toward the transducer head in opposition to the bias of the resilient means during the travel of the first cassette carriage from the first toward the second position and to allow the first and second cassette carriages to travel toward the transducer head when the first cassette carriage reaches the second position.

3. The apparatus of claim 1 wherein the resilient means of the cassette shift means comprises:

(a) a push lever pivotally supported within the casing; and (b) a resilient member acting on the push lever so as to cause the same to push the second cassette carriage from the third toward the fourth position.

4. The apparatus of claim 3 wherein the push lever has a push member fixedly mounted thereon for engagement with the tape cassette when the latter is in the working position, the push member being adapted to engage the tape cassette so as to push the same both against the second cassette carriage and toward the transducer head.

5. The apparatus of claim 1 wherein the tape transport shift means comprises:

(a) a tape transport carriage having the tape transport means mounted thereon and movable therewith between a fifth position for holding the drive spindles of the tape transport means out of engagement with the hubs of the tape cassette and a sixth position for holding the drive spindles in driving engagement with the hubs of the tape cassette lying in the working position; and (b) cam means for normally holding the tape transport carriage in the fifth position and moving the same to the sicth position in response to the travel of the second cassette carriage from the third to the fourth position with the tape cassette.

6. The apparatus of claim 5 wherein the cam means comprises:

(a) cam follower means operatively engaged with the tape transport carriage for moving the same between the fifth and sixth position;

(b) second resilient means acting on the cam follower means for biasing the tape transport carriage from the fifth toward the sixth position;

(c) a cam operatively engaged with the cam follower means and movable between a seventh position for holding the tape transport carriage in the fifth position via the cam follower means and an eighth position for holding the tape transport carriage in the sixth position via the cam follower means; and (d) third resilient means biasing the cam from the seventh toward the eighth position;

(e) the cam being adapted to engage with the second cassette carriage, when the latter is in the third position, thereby to be held in the seventh position against the bias of the third resilient means, the cam being disengaged from the second cassette carriage upon movement thereof from the third toward the fourth position whereupon the cam travels from the seventh to the eighth position under the bias of the third resilient means thereby causing the cam follower means to move the tape transport carriage from the fifth to the sixth position under the bias of the second resilient means.

7. The apparatus of claim 6 further comprising ejector means for ejecting the tape cassette out of the entrance opening in the casing, the ejector means comprising:

(a) fourth resilient means biasing the first cassette carriage from the second toward the first position, the first cassette carriage being moved from the first to the second position by and with the inserted tape cassette against the bias of the fourth resilient means;

(b) fifth resilient means biasing the second cassette carriage from the fourth toward the third position, the force of the fifth resilient means being less than the force of the first recited resilient means whereby the second cassette carriage travels from the third to the fourth position under the bias of the first resilient means in opposition to the bias of the fifth resilient means when released by the locking means;

(c) an ejector member operatively engaged with the cam and actuable manually for movement between a nineth position for allowing the cam to travel from the seventh to the eighth position and a tenth position for holding the cam in the seventh position, the ejector member being further effective to prevent the first resilient means from biaising the second cassette carriage when in the tenth position; and (d) sixth resilient means for normally holding the ejector member in the nineth position;

(e) whereby upon manual actuation of the ejector member from the nineth to the tenth position against the bias of the sixth resilient means, the cam is thereby returned from the eighth to the seventh position against the bias of the third resilient means thereby causing disengagement of the drive spindles of the tape transport means from the hubs of the tape cassette via the cam follower means, and the second cassette carriage returns with the tape cassette from the fourth to the third position under the bias of the fifth resilient means, the tape cassette being subsequently carried by the first cassette carriage from the second to the first position of the latter under the bias of the fourth resilient means, the tape cassette partly projecting out of the entrance opening in the casing when thus carried back to the first position of the first cassette carriage.

* * * * *